United States Patent
Ovsianikov et al.

(10) Patent No.: US 12,358,228 B2
(45) Date of Patent: Jul. 15, 2025

(54) METHOD FOR LITHOGRAPHY-BASED GENERATIVE PRODUCTION OF THREE-DIMENSIONAL COMPONENTS

(71) Applicant: TECHNISCHE UNIVERSITÄT WIEN, Vienna (AT)

(72) Inventors: Aleksandr Ovsianikov, Vienna (AT); Jürgen Stampfl, Vienna (AT); Robert Liska, Schleinbach (AT); Peter Gruber, Vienna (AT)

(73) Assignee: TECHNISCHE UNIVERSITAT WIEN, Vienna (AT)

( * ) Notice: Subject to any disclaimer, the term of this patent is extended or adjusted under 35 U.S.C. 154(b) by 792 days.

(21) Appl. No.: 16/315,333

(22) PCT Filed: Jul. 6, 2017

(86) PCT No.: PCT/AT2017/000054
§ 371 (c)(1),
(2) Date: Jan. 4, 2019

(87) PCT Pub. No.: WO2018/006108
PCT Pub. Date: Jan. 11, 2018

(65) Prior Publication Data
US 2019/0255773 A1  Aug. 22, 2019

(30) Foreign Application Priority Data
Jul. 7, 2016  (EP) .................... 16450014

(51) Int. Cl.
*B29C 64/00* (2017.01)
*B29C 64/135* (2017.01)
(Continued)

(52) U.S. Cl.
CPC .......... *B29C 64/386* (2017.08); *B29C 64/135* (2017.08); *B29C 64/268* (2017.08);
(Continued)

(58) Field of Classification Search
CPC ....... C04B 35/573; B33Y 10/00; B33Y 30/00; B33Y 50/02; B29C 64/386; B29C 64/268;
(Continued)

(56) References Cited

U.S. PATENT DOCUMENTS 5,753,171 A    5/1998  Serbin et al.
2013/0056910 A1*  3/2013  Houbertz-Krauss .........
                                                        B29C 64/386
                                                        264/401
(Continued)

FOREIGN PATENT DOCUMENTS

EP    2905121 A1   8/2015
WO   2013/093612 A1   6/2013
WO   2015/197794 A1   12/2015

OTHER PUBLICATIONS

Baldeck et al, FR 3023012, "Three-Dimensional Printing Device", ((translation) Jan. 1, 2016, 6 pgs < FR_3023012.pdf>.*
(Continued)

*Primary Examiner* — Tuan A Vu
(74) *Attorney, Agent, or Firm* — Pillsbury Winthrop Shaw Pittman, LLP

(57) ABSTRACT

In a method for lithography-based generative production of three-dimensional components, in which material that can be solidified under the effect of electromagnetic radiation is arranged in a vat, a build platform is positioned at a distance from the vat bottom, material located between the build platform and the vat bottom is irradiated at selected locations with the aid of an irradiating unit, the electromagnetic radiation is introduced into the material from below through a vat bottom that is transmissive to the radiation, at least in a certain region, and successively focused on focal points within the material, whereby a volume element of the material that is respectively located at the focal point is (Continued)

solidified. The solidification takes place by means of multiphoton absorption and the volume of the focal point is varied at least once during the method, and so the component is built up from solidified volume elements of different volumes.

23 Claims, 4 Drawing Sheets

(51) Int. Cl.
*B29C 64/268* (2017.01)
*B29C 64/386* (2017.01)
*B29C 64/393* (2017.01)
*B33Y 10/00* (2015.01)
*B33Y 30/00* (2015.01)
*B33Y 50/02* (2015.01)
*C04B 35/573* (2006.01)

(52) U.S. Cl.
CPC ............ *B29C 64/393* (2017.08); *B33Y 10/00* (2014.12); *B33Y 30/00* (2014.12); *B33Y 50/02* (2014.12); *C04B 35/573* (2013.01)

(58) Field of Classification Search
CPC ..... B29C 64/393; B29C 64/135; B29C 67/00; H01L 21/461
See application file for complete search history.

(56) References Cited

U.S. PATENT DOCUMENTS

2017/0225393 A1* 8/2017 Shkolnik ................ B33Y 10/00
2017/0232637 A1* 8/2017 DeMuth ................ C04B 35/573
264/497

OTHER PUBLICATIONS

Kunishi et al, JP 2010192387, "Manufacturing Method of Conductive Pattern Forming Substrate", (translation) Sep. 2, 2010, 15 pgs <JP_2010192387.pdf>.*
International Search Report PCT/AT2017/000054 dated Nov. 2, 2017 with English language translation.
International Preliminary Report on Patentability dated Dec. 13, 2018 issued in corresponding International Patent Application No. PCT/AT2017/000054 w/English translation (12 pgs.).
English translation of Notification of Deficiencies dated Mar. 30, 2025, issued in corresponding Israeli Patent Application No. 264086 (7 pgs.).

* cited by examiner

METHOD FOR LITHOGRAPHY-BASED GENERATIVE PRODUCTION OF THREE-DIMENSIONAL COMPONENTS

CROSS-REFERENCE TO RELATED APPLICATIONS

This is the U.S. National Stage of PCT/AT2017/000054, filed Jul. 6, 2017, which claims priority to EP 16450014.2, filed Jul. 7, 2016, and all contents of each of these applications are incorporated herein by reference in their entireties.

The invention relates to a method for the lithography-based generative production of three-dimensional components, in which a material solidifiable by exposure to electromagnetic radiation is present in a tank, a construction platform is positioned at a distance from the tank bottom, material present between the construction platform and the tank bottom is position-selectively radiated by a radiation unit, wherein the electromagnetic radiation is introduced into the material from below, through a tank bottom permeable to the radiation at least in certain areas, and successively focused on focal points within the material, whereby a volume element of the material respectively present at a focal point is solidified, wherein the solidification is effected by multiphoton absorption.

The invention further relates to a device for the lithography-based generative production of three-dimensional components, which is, in particular, suitable for carrying out such a method.

Traditionally, lithography-based generative production (L-GF, e.g. stereolithography) has mainly been used for manufacturing prototypes and functional patterns. Technological advances have increasingly focused on real production applications (e.g. transparent dental braces, hearing aid cups). In the course of such developments, it has become more and more important to enable the production of parts as large as possible. The achievable throughput is also of great interest. Unlike other generative methods, lithography-based techniques (e.g. stereolithography), above all, offer advantages in terms of resolution, precision and surface quality.

In presently available L-GF methods, exposure takes place either from above onto a tank filled with photosensitive material as described in WO 93/08506 A1, or from below through a transparent tank containing a thin layer of photosensitive material, cf. WO 01/40866 A1. Exposure from above involves two difficulties: (1) Huge material quantities are required for large components, since the entire component has to be completely immersed in the photosensitive material. (2) In order to obtain good surfaces, very thin layers of photosensitive material have to be applied, which is very difficult with layer thicknesses of below 50 μm.

Exposure from below also involves difficulties: The liquid photosensitive material in this case is present between the transparent tank and the construction platform, which is upwardly moved layer by layer. Despite the non-stick coating of the tank, the component adheres to the tank during the build procedure, which is undesirable. When lifting the construction platform, high extraction forces may thus occur, which will lead to problems, in particular when producing large components. There are, however, two new approaches (e.g. US 2014/361463 A1), in which an inhibition layer is produced between the tank and the component by the introduction of oxygen in order to reduce such adherence. Yet, this involves the problem of the continuously flowing material having to flow into a very thin gap, which is problematic with thicker-walled components or highly viscous materials.

All of the above-mentioned methods additionally involve the problem of the build times increasing very rapidly with an increase in the resolution.

DE 10111422 A1 proposed a method in which the solidification of the liquid photosensitive material is effected by multiphoton absorption. To this end, a focused laser beam is directed into the photosensitive material bath, wherein the radiation conditions for a multiphoton absorption process triggering solidification are only met in the immediate environment of the focus such that, within the bath volume, the focus of the beam is directed to the points to be solidified as a function of the geometric data of the shaped article to be produced. The radiation of the material bath in the method according to DE 10111422 A1 is performed from above, wherein the radiation intensity is selected such that the liquid for the used radiation is substantially transparent above the focal point so as to enable the direct polymerization of the bath material position-selectively within the bath volume, i.e. even far below the bath surface.

However, a change in the position of the focal point along the optical axis of the used optical imaging system results in image errors increasing with an increasing portion of material in the optical path in the case of a refraction index that is not optimally adapted. This is of particular disadvantage in processes in which very fine structures are produced and a high resolution of the imaging system is, therefore, required. In order to ensure such high resolution of the optical imaging system, the refraction index of the photosensitive material must be adapted to the optical imaging system, or vice versa. If this is not the case, or where the material changes its properties during the build process, for instance due to a change in the water content, the achievable resolution of the built structure will decrease.

For multiphoton absorption structuring with a high resolution in the nanometer range, a method in which the lens of the optical imaging system is immersed in the photosensitive material was, therefore, proposed in DE 102011012484 A1. This enables the realization of larger component heights with high resolution, yet the optical imaging unit is in constant contact with the photosensitive resin, which can lead to damage of the optics due to an undesired material conversion, for instance by stray light or ambient light.

In EP 2905121 A1, a method is described in which the solidification of the photosensitive material also takes place by multiphoton absorption, and the exposure of the bath is effected from below through a transparent bottom of the material tank. Focusing is performed on focal points located at a fixed distance from the tank bottom, wherein the construction platform is extracted from the bath in the vertical direction during ongoing work progress so as to enable the production of large-height components.

The document, WO 2015/197794 A1, describes a unit for changing the focal point volume for multiphoton absorption structuring, which is based on the use of different diffractive optical elements upstream of the imaging system to adapt the focal point volume. The arrangement of the diffractive optical elements directly upstream of the optical imaging system offers the option to upgrade existing systems in a simple manner, yet is only difficult to extend by additional elements. That arrangement, in particular, cannot be combined with a deflection unit or comparable elements, since the beam, in the event of an excursion from the resting position of the deflection system, will no longer impinge on the diffractive optical element at the optimum angle, thus reducing the diffraction efficiency.

The majority of the previous methods in the field of multiphoton absorption structuring, like EP 2905121 A1, aims to write structures with very high resolution. By high-resolution optical imaging systems, mostly from microscopy, minimum structural sizes of up to 50 nm are achieved. The high resolution necessitates small focal point volumes, which are achieved by using optical imaging systems with high magnification and high numerical aperture. The high numerical aperture also enables the achievement of an approximately spherical focal point volume (typically smaller than $1\times1\times1$ $\mu m^3$). Due to the small focal point volume, the throughput of such plants is, however, very small, since, for instance, a total of more than $10^9$ points must be exposed for a volume of 1 $mm^3$. This results in very long build times, which is the main reason for the reduced industrial application of multiphoton absorption methods.

The present invention, therefore, aims to improve a method and a device of the initially defined kind to the effect that the component throughput is increased without losing the option of a high structural resolution.

To solve this object, the invention in a method of the initially defined kind consists in that the volume of the focal point is varied at least once during the method such that the component is built up from solidified volume elements of different volumes. Due to the variable volume of the focal point, high resolutions are possible (at small focal point volumes). At the same time, a high writing speed (measured in $mm^3/h$) is achievable (at a large focal point volume). The invention thus combines a high resolution with a high throughput. The variation of the focal point volume can, for instance, be utilized in that in the interior of the component to be built a large focal point volume is used to increase the throughput, and on the surface of the component a smaller focal point volume is applied to form the component surface with high resolution. An enlargement of the focal point enables a higher structuring throughput, since the material volume solidified in an exposure process is increased. In order to maintain a high resolution at a high throughput, small focal point volumes can be used for finer structures and surfaces, and larger focal point volumes can be used for coarse structures and/or for filling internal spaces.

In a preferred mode of operation, the variation of the focal volume is effected such that the largest focal point volume during the production of a component is larger than 1 $\mu m^3$, preferably larger than 100 $\mu m^3$, in particular larger than 10,000 $\mu m^3$.

In the context of the invention, the principle of multiphoton absorption is utilized to initiate a photochemical process in the photosensitive material bath. As a result of the photochemical reaction, a change of the material into at least one other state occurs, wherein typically a photopolymerization takes place. The exposure to light in this case is performed from below through a tank bottom that is transparent to the electromagnetic radiation. The principle of multiphoton absorption is based on the fact that said photochemical process only takes place in those regions of the optical path in which a photon density sufficient for said multiphoton absorption is available. The highest photon density occurs in the focal point of the optical imaging system such that the multiphoton absorption will most probably occur in the focal point. Beyond the focal point, the photon density is smaller such that the probability of multiphoton absorption beyond the focal point is too low to cause an irreversible change of the material by a photochemical reaction. At the used wavelength, the electromagnetic radiation is able to pass the material largely unimpeded, an interaction between the photosensitive material and the electromagnetic radiation only occurring in the focal point. The principle of multiphoton absorption is, for instance, described in Zipfel et al, "Nonlinear magic: multiphoton microscopy in the biosciences", NATURE BIOTECHNOLOGY VOLUME 21 NUMBER 11, NOVEMBER 2003.

A collimated laser beam may preferably be used as electromagnetic radiation source. The laser is able to emit one or several, fixed or variable wavelengths. It is, in particular, a continuous or pulsed laser with pulse lengths in the nanosecond, picosecond or femtosecond ranges. A pulsed femtosecond laser offers the advantage of requiring less average power for the multiphoton absorption.

By photosensitive material, any material fluid under build conditions is understood, which is transformed into a second state by multiphoton absorption in the focal point volume—e.g. by polymerization. The material change must be limited to the focal point volume and its direct environment. The change of substance proper ties can be permanent and, for instance, consist in a change from a liquid into a solid state, yet may also be only temporary. By the way, even a permanent modification may be reversible or non-reversible. The change of material properties need not necessarily occur completely from one state into the other, but may also exist as a mixed form of both states.

The power of the electromagnetic radiation and the exposure time influence the quality of the produced component. By adapting the radiation power and/or the exposure time, the volume of the focal point can be varied within a narrow range. At radiation powers that are too high, additional processes will occur, which may cause damage to the component. If the radiation power is too low, no permanent change in the material properties will occur. There are, therefore, typical build process parameters associated with good component properties for each photosensitive material.

The variation of the focal point volume according to the invention is, however, not based on a change of the intensity of the used electromagnetic radiation. Operation rather takes place at the (optimum) radiation intensity selected for the build process, which is left unchanged during the component build-up. The Method according to the invention is, therefore, preferably carried out such that the change of the focal point volume is performed at a constant radiation intensity, wherein the used average power of the electromagnetic radiation is adapted accordingly.

By focal point volume, the volume of an exposed point after the preparation step at the typical build process parameters is, therefore, understood. The change of the focal point volume according to the invention means a change of the spatial intensity distribution in the focal point. In this respect, the spatial intensity distribution of the focal point can be changed in one or in several directions. Thus, the intensity distribution can, for instance, be increased in all three spatial directions by a reduction of the effective numerical aperture of the optical imaging system. When using a diffractive optical element, the focus can be changed into a line or surface, or the number of focal points can be increased.

A preferred mode of operation of the invention provides that the change of the focal point volume is performed by a unit comprising at least one optical element disposed in the optical path between the source of electromagnetic radiation and an optical imaging system focusing on the focal point. The optical element is preferably arranged such that the beams of the electromagnetic radiation impinge on the former at a right angle, i.e. that the radiation impinges on the optical element in the direction of the optical axis of the same.

The change of the focal point volume by the at least one optical element can be performed in various ways, wherein the options indicated below can also be combined.

In a preferred manner, it is provided that the change of the focal point volume is performed by a variation of the effective numerical aperture or the optical imaging system. By numerical aperture of the optical imaging system, its nominal properties under optimum conditions at the smallest possible focal point size are understood. When larger focal point volumes occur upstream of the optical imaging system due to a change in the optical parameters, this is referred to as the effective numerical aperture of the imaging system.

It may preferably also be provided that the change of the focal point volume is performed by a variation of the beam diameter along the optical path.

The method can preferably also be performed such that the variation of the beam diameter is performed by an, in particular variable, expansion optics or an adjustable aperture. Expansion optics denotes an optical system by which the beam diameter is increased or reduced. The beam diameter, along with the focal length of the optical imaging system, determines the focal point volume. At a constant focal length, a change of the beam diameter, therefore, results in a change of the effective numerical aperture, and hence a change of the focal point volume. The expansion optics can be designed with constant or with variable expansion. With variable expansion, the expansion optics can be used to change the focal point volume.

A change of the beam diameter can also be performed with the aid of an adjustable aperture, wherein a reduction of the beam diameter will, for instance, result in a reduction of the effective numerical aperture, the diameter and the length of the focal point volume thus increasing. The aperture can be designed as a one-dimensional slit aperture, a two-dimensional iris or any other form of aperture.

The at least one optical element is preferably comprised of a diffractive optical element and/or an optical lens. A possible application of a diffractive optical element resides in the formation of several beams differing in terms of emergence angle from the impinging beam. The individual beams are imaged on the focal plane by the optical imaging system, the individual focal points of the individual beams constituting different points in the focal plane. Depending on the diffractive optical element used, one or several focal points can be imaged. The focal points may even be located so close to one another that the individual points merge into one another. In this case, lines or surfaces are formed. The diffractive optical element can be static or dynamic. Dynamic diffractive optical elements are also referred to as "spatial light modulators".

The unit for changing the focal point volume may also include an optical system for beam forming. Such an optical system may comprise two cylindrical lenses with variable distance for the targeted control of astigmatism in the optical imaging system. A dimension of the focal point volume can be selectively influenced by varying the lens distance.

Furthermore, the unit for changing the focal point volume may also comprise one or several fast moving beam deflection systems, which guide the beam at a known angle relative to the other deflection systems. In a preferred manner, two deflection systems are provided at a right angle to each other. While one of the deflection systems guides the beam through the photosensitive material, the other one expands the modified material volume by rapidly moving the beam orthogonally to the beam guiding direction.

The above-mentioned measures for changing the focal point volume serve to perform the change of the focal point volume at least in one, preferably three, spatial directions perpendicular to one another.

In the context of the described measures for changing the focal point volume, the numerical aperture of the optical imaging system can be selected to be small, the numerical aperture preferably being selected to be smaller than 0.8, preferably smaller than 0.2.

As already pointed out above, the component according to the invention is built such that the electromagnetic radiation is introduced into the material from below, through a tank bottom permeable to the radiation at least in certain areas, and successively focused on a plurality of focal points within the material. In this respect, it is preferably proceeded such that the electromagnetic radiation is deflected by a deflection unit preferably disposed upstream of the optical imaging system, in order to adjust the focal point in a plane (X- and Y-directions) substantially parallel with the tank bottom. Such an adjustment is performed each time after the solidification of a material volume element. For deflecting the beam, any beam deflection units known from the prior art can be used. Thus, it is, for instance, possible to provide a separate beam deflection device for a beam deflection in the X-direction and a beam deflection device for a beam deflection in the Y-direction. In addition, the beam deflection unit can be combined or partially replaced with a positioning system, which moves the image field of the imaging system in order to enable the production of components with larger extensions in the X- and Y-directions. In this respect, it is irrelevant whether the optical imaging system or the component is moved.

The beam deflection device is preferably arranged in the optical path between the unit for changing the focal point volume, in articular in the event of diffractive optical elements, and the optical imaging system. This will ensure that the beam deflection caused by the deflection unit will not affect the action of the optical element.

A preferred mode of operation, moreover, provides that the construction platform is stepwise lifted during the ongoing build progress. The build-up of the component can, for instance, be performed in layers. At first, all volume elements are produced in one plane or layer, whereupon the construction platform is lifted to form the next layer. To this end, a construction platform adjustable in the vertical direction (Z-direction) is provided in the photosensitive material. The first layer of the future component, which is produced by multiphoton-induced material conversion, will adhere to the construction platform. The second layer will adhere to the first layer, and every further layer will adhere to the respectively preceding layer, the component thus growing out of the tank by a layered build-up.

In a particularly preferred manner, the focal point is arranged at a distance from the tank bottom. Typically, the distance of the focal point from the tank bottom ranges between 20 μm and 2 mm. Due to the distance between the polymerization zone and the tank bottom, no undesired adherence of the converted material to the tank will occur. In addition, it will be easier for fresh material to continuously flow between the component and the tank so as to be available as starting material for the subsequent layers. Since no adherence of the component to the tank bottom occurs, no extraction forces are to be expected when lifting the construction platform. This effect is based on the fact that, as already pointed out above, the photochemical process in multiphoton absorption can only occur in a well-defined focus volume. If the distance between the tank bottom and the build layer is selected to be relatively large, material will be able to continuously flow into the gap between the tank bottom and the component during the build process, thus enabling a largely continuous process.

In the described layered structure of the component, the normal distance of the focal points from the tank bottom can be kept constant, since the movement of the component in the vertical direction is realized by the movable construction platform. The optical boundary conditions will consequently remain constant during the entire build process. As opposed to the prior art, where the focus is moved in the vertical direction, the advantage is thus achieved that the electromagnetic radiation need not be focused differently deeply into the photosensitive material, which would lead to depth-dependent variations of the focus quality. The constantly maintained normal distance is preferably measured between the tank bottom and the center of the focal point volume. Alternatively, the constantly maintained distance can be measured between the tank bottom and the lower boundary of the focal point volume.

The change of the focal point volume according to the invention can also be performed within one and the same layer such that a layer is composed of volume elements of different volumes. It may, however, also be proceeded such that a layer is only composed of equally large volume elements, and a changed focal point volume is used for the next layer.

Any optical system known from the prior art and comprising any number of optical elements for focusing can be employed as said optical imaging system focusing the electromagnetic radiation on the respective focal point. The optical imaging unit can be used upstream or downstream of the beam deflection unit. An F-theta optics can, for instance, be used downstream of the beam deflection system, having a moderate numerical aperture of <0.2.

Between the beam deflection unit and the focusing optics of the optical imaging system, an additional optical beam expansion or reduction means can be inserted. This additional optical system is able to increase or reduce the effective numerical aperture by changing the beam diameter while maintaining the focal length of the optical imaging unit. Any adaptations downstream of the beam deflection unit will, however, affect the beam deflection speed.

Another aspect of the invention relates to a device for the lithography-based generative production of three-dimensional components, in particular for carrying out a method according to the first aspect of the invention. The device comprises a source of electromagnetic radiation, a tank with a tank bottom permeable to the radiation at least in certain areas, into which material to be solidified can be filled, a construction platform held at an adjustable level above the tank bottom, and a radiation unit actuatable from below through the tank bottom for the position-selective radiation of material present between the construction platform and the tank bottom, wherein the radiation unit comprises an optical imaging system for successively focusing the radiation on focal points within the material, whereby a volume element of the material respectively present at a focal point is solidifiable by multiphoton absorption. The device is characterized in that the radiation unit comprises at least one optical element disposed in the optical path between the source of electromagnetic radiation and the optical imaging system, which optical element is designed to change the volume of the focal point.

The at least one optical element can preferably be used for changing the effective numerical aperture of the imaging system.

It is preferably provided that the at least one optical element is provided for varying the beam diameter along the optical path.

It is preferably provided that the at least one optical element is comprised of a variable expansion optics or an adjustable aperture.

In a preferred manner, it may also be provided that the at least one optical element is comprised of a diffractive optical element and/or an optical lens.

The at least one optical element may, in particular, comprise a beam forming system including, for instance, two cylindrical lenses held at a variable distance relative to each other.

It is preferably provided that the variation of the beam diameter is performed by at least one fast moving deflection system (e.g. wobbling of the beam and hence an increase in the focal point volume on a time average).

In a preferred manner, the change of the focal volume can be realized by a rapid exchange of different imaging systems.

The radiation unit preferably comprises a deflection unit, preferably disposed upstream of the imaging system, for adjusting the focal point in a plane substantially parallel with the tank bottom.

The unit for changing the focal point volume may preferably comprise a fast deflection system, which expands the beam preferably at a right angle to an axis of the deflection unit (e.g. wobbling of the beam and hence an increase in the focal point volume on a time average).

A control unit cooperating with the radiation unit is advantageously provided for solidifying in successive radiation steps volume elements located in a layer on the construction platform so as to form a layer of pregiven geometry by control of the radiation unit and after the radiation steps adapting, for the layer, the relative position of the construction platform to the tank bottom so as to successively build up the component in the desired shape.

In the following, the invention will be explained in more detail by way of exemplary embodiments schematically illustrated in the drawing. Therein, FIG. 1 depicts a unit for carrying out the method according to the invention;

Figure 6:
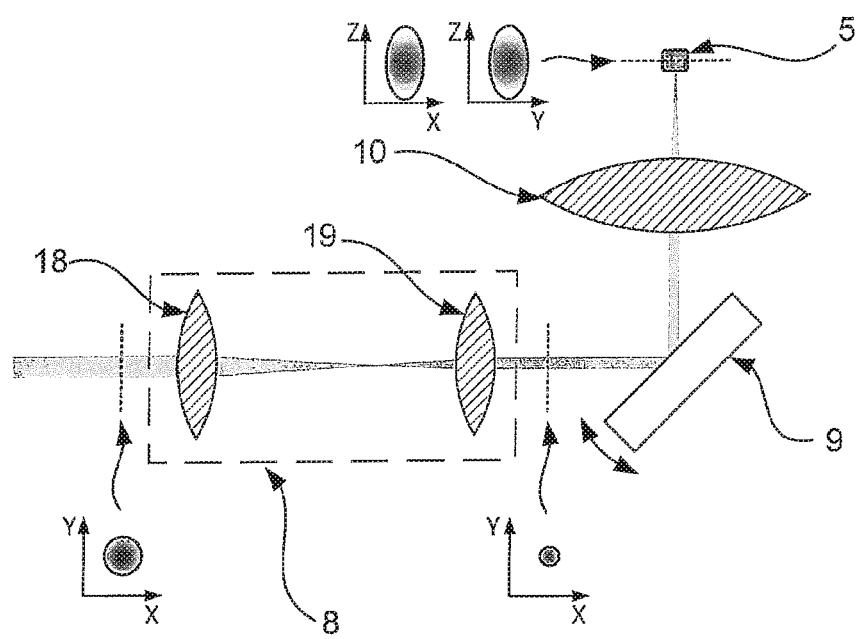

FIG. 6 snows a further modified configuration of the unit for focal volume adaptation; and FIG. 7 to 10 illustrate different build strategies using large and small volume elements.

Figure 1:
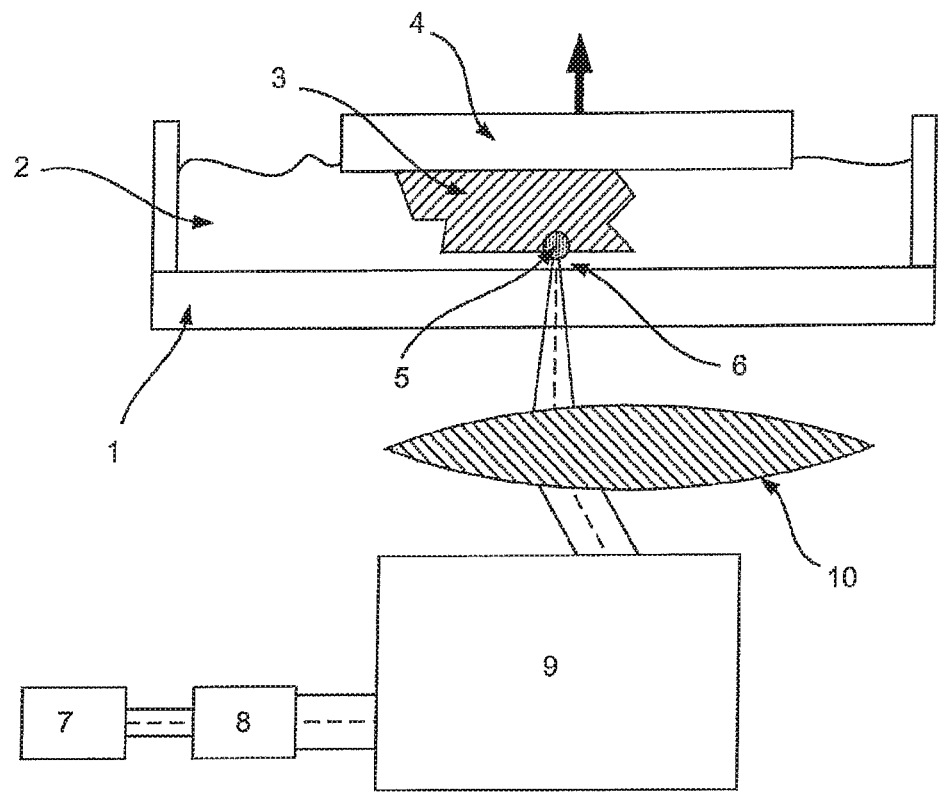

From FIG. 1, it is apparent that an electromagnetic wave emitted by a laser 7 is guided through a unit for changing the focal point volume 8 and via a beam deflection unit 9, and is focused into a photosensitive material 2 through a transparent bottom plate 1 by an optical imaging system 10. In the focus 5 of the optical imaging system 10, the state of the photosensitive material 2 is changed, thus building up the component 3. The component 3 is suspended from a construction platform 4, which can be moved in the vertical direction. After completion of the exposure of the current layer, the construction platform 4 is lifted and the next layer is exposed. The use of a laser 7 with a high peak power enables the application of multiphoton absorption, so that the change of state of the material only occurs in the focus 5, but not in the optically "dead" zone 6 between the tank bottom 1 and the construction platform, or the already formed component. Thus, no adherence of the component to the transparent bottom plate 1 can occur.

All elements in FIG. 1 are only symbolically shown and can be arbitrarily expanded according to the knowledge of the skilled artisan, for instance by using additional lens systems, apertures, mirrors, filters or beam splitters.

Figure 2:
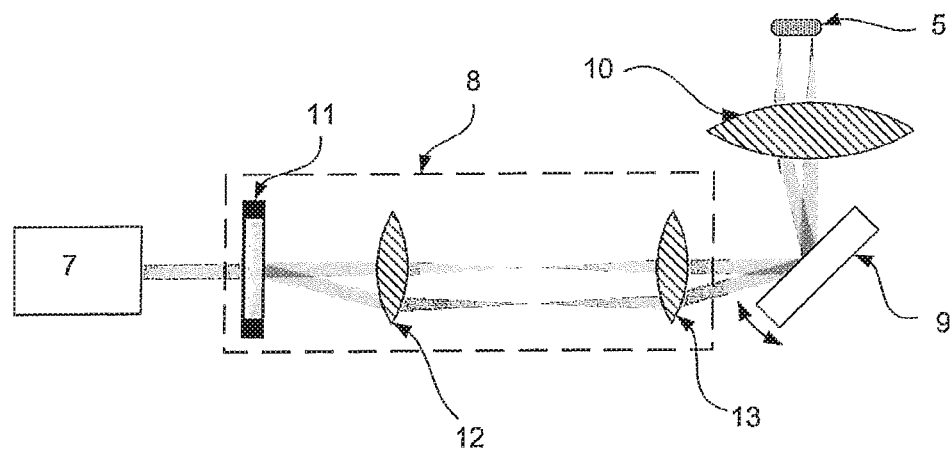
FIG. 2 depicts a unit for focal volume adaptation.

FIG. 2 schematically illustrates the unit 8 for changing the focal point volume. Said unit comprises a diffractive optical element 11, which splits the emerging beam into two beams passing a system comprised of two lenses 12 and 13. The splitting of the beam is aimed to create two points neighboring in the focal plane. If the two points overlap each other, this may also be referred to as a line.

Figure 3:
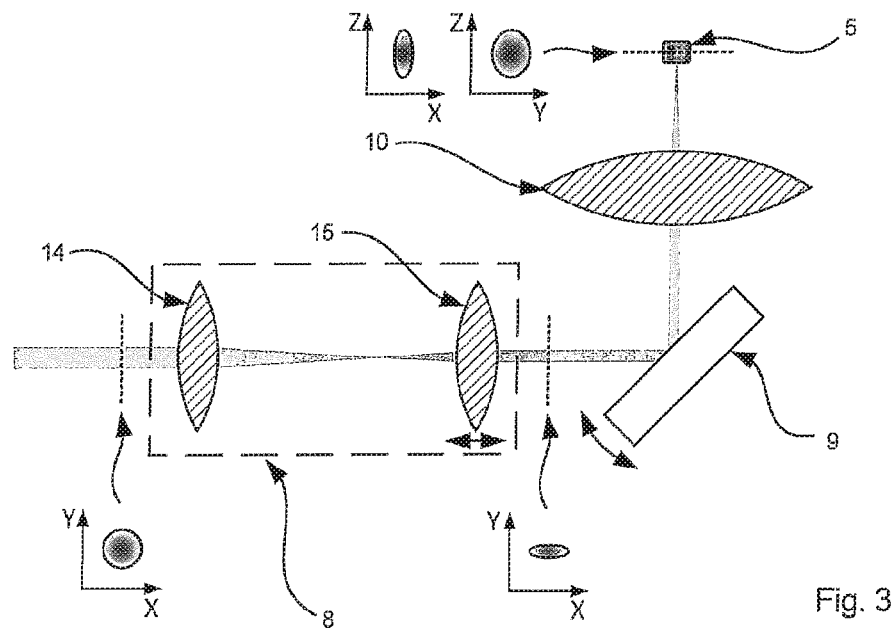
FIG. 3 shows a modified configuration of the unit for focal volume adaptation.

FIG. 3 shows a modified configuration of the unit 8 for focal volume adaptation. The unit 8 comprises two mutually spaced-apart, coaxial, cylindrical lenses 14 and 15 through which the beam passes. The beam profile prior to entering the unit 8, i.e. in the plane illustrated in broken lines, is circular. At the exit from the unit 8, a compression in the direction of the y-axis is to be observed. This results in the expansion of the focal point volume on the focal point 5 in the x, z-plane and in the y, z-plane, which is depicted in the drawing.

By adjusting the distance between the cylindrical lenses 14 and 15, the volume of the overall focal point 5 is changed.

Figure 5:
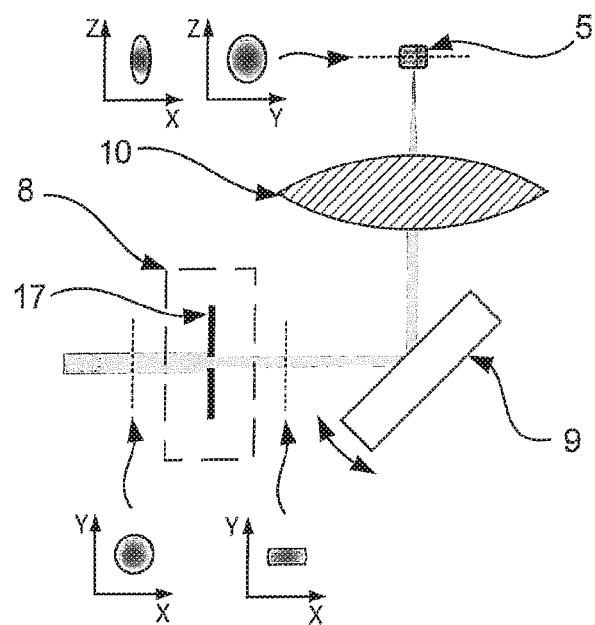
FIG. 5 depicts a further modified configuration of the unit for focal volume adaptation.

A similar effect is achieved when using a slit aperture 17, as is shown in the configuration according to FIG. 5, yet this would lead to intensity losses due to the truncation of the beam.

Figure 4:
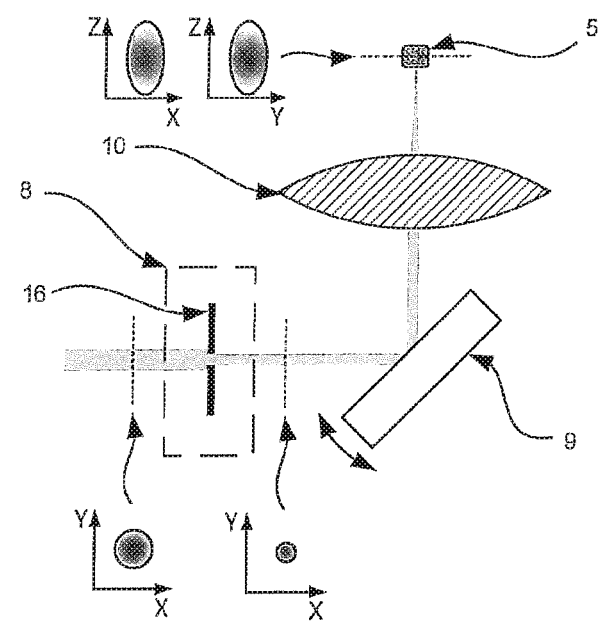
FIG. 4 illustrates a further modified configuration of the unit for focal volume adaptation.

In the configuration according to FIG. 4, an iris 16 causes a reduction of the effective numerical aperture of the imaging system, thus making the focal point volume both longer and wider.

The expander comprised of lenses 18 and 19, which is shown in the configuration according to FIG. 6, has the same effect as the iris 16, yet avoids intensity losses by reducing the beam diameter without truncating the beam.

The options for changing the focal point volume illustrated in FIGS. 2 to 6 are, in particular, realized by using pulsed laser light at a wavelength ranging from 400 to 1600 nm, the pulse lengths ranging between 1 fs and 1 ns.

Figure 7:
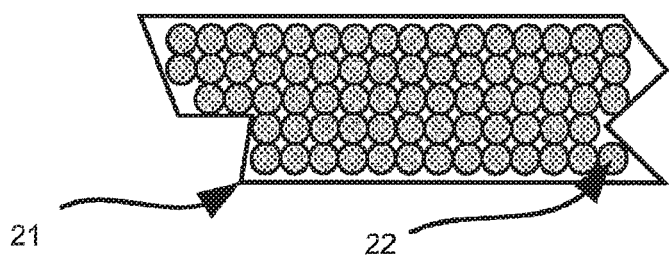

FIG. 7 depicts the component built by a method in which exclusively small focal point volumes 22 are solidified without adaptation of the volume. The high resolution results in a large number of points to be written, and hence a high process time for each layer. This build strategy is advantageous for small high-resolution structures where an adaptation of the focal point volume would not provide any advantage or the throughput is not decisive.

Figure 8:
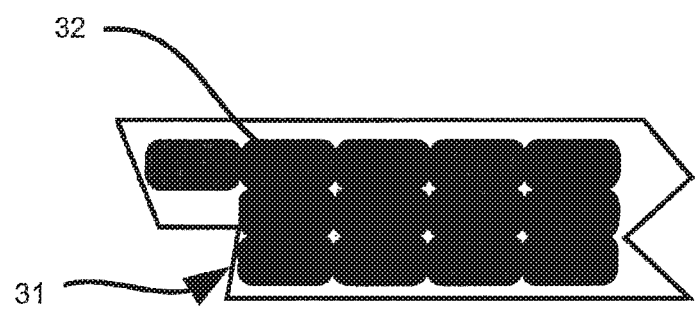

For the build process illustrated in FIG. 8, just one large focal point volume 32 is used without adaptation of the volume. The build strategy has a high throughput, yet a low resolution. The focal point volume is controlled by the optical unit 8, whereby the surface of the focal point volume is increased and the effective numerical aperture is adapted to the desired layer thickness. This build strategy is advantageous for components that do not need a high resolution, yet require a high throughput.

Figure 9:
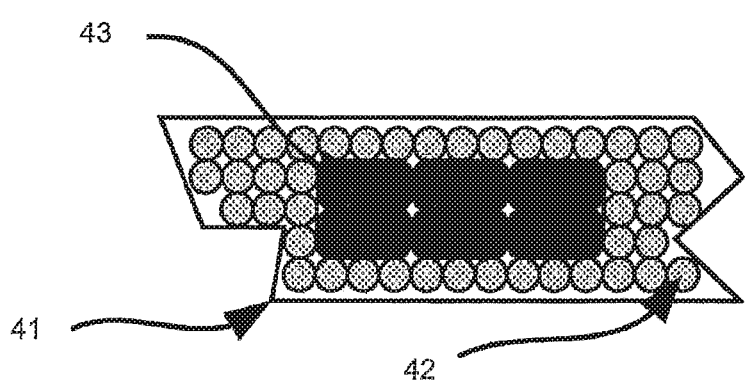

The possible sequence of a build process with two different focal point volumes is indicated in FIG. 9. By the adaptation of the focal point volume during the build process by the optical unit 8, the process time per layer is reduced.

The structure 41 to be built is alternately built up, layer by layer, of fine 42 and coarse 43 filling volumes. With the fine filling volumes 42, those parts of the structure which cannot be reached by the coarse filling volume 43 are exposed. It is advantageous to initially write high-resolution parts with the small focal point volume 42 and fill the internal volume subsequently, since already built structures may cause a distortion of the focal point. The adaptive focal point volume enables the production of components with both a high resolution and a high throughput. This build strategy is suitable for high-resolution components with slight surface roughness.

Figure 10:
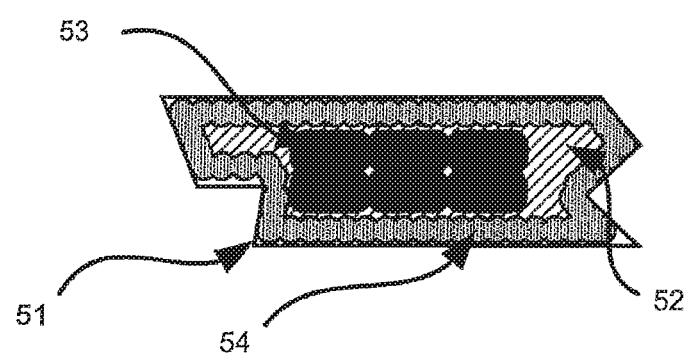

The sequence of the build strategy in FIG. 10 is similar to the build strategy illustrated in FIG. 9, except that here the surface of the component is built with an additional, small focal point volume 54 and a small layer thickness. The three focal point volumes are referred to as follows: the fine filling volume 52, the coarse filling volume 53, and the surface volume 54. The surface volume has the smallest volume and hence the highest resolution for a good shape reproduction of edges and corners. The fine filling volume 52 is equal to, or larger than, the surface volume 54, filling gaps that cannot be reached by the coarse filling volume 53. This build strategy is suitable for components requiring an excellent shape reproduction, surface quality and a high throughput.

The invention claimed is:

1. A method for the lithography-based generative production of three-dimensional components, in which a material solidifiable by exposure to electromagnetic radiation from a source is present in a tank, a construction platform is positioned at a distance from a tank bottom of the tank, the tank bottom being permeable to the electromagnetic radiation at least in certain areas, the material present between the construction platform and the tank bottom is configured to be position-selectively radiated by a radiation unit, the radiation unit comprising an optical imaging system, at least one optical element, and a deflection unit; the optical imaging system configured to successively focus the electromagnetic radiation on focal points within the material by beam deflection, so that a volume element of the material respectively present at a focal point is solidifiable by multiphoton absorption, the at least one optical element disposed in an optical path between the source of electromagnetic radiation and the optical imaging system, the deflection unit disposed upstream of the optical imaging system and downstream of the source of electromagnetic radiation and configured to deflect the electromagnetic radiation to change a direction of a beam of the electromagnetic radiation emanating from the deflection unit and adjust the focal point in a plane substantially parallel with the tank bottom;

wherein the method comprises:

introducing the electromagnetic radiation from the source into the material from below and through the tank bottom;

successively focusing on focal points within the material using the optical imaging system to solidify a volume element of the material respectively present at each focal point;

adjusting the focal points using the deflection unit to change the direction of the beam while holding the optical imaging system stationary;

changing a focal point volume on the focal points within the material to change a state of material at said focal points via changing a spatial intensity distribution of the electromagnetic radiation in one or more spatial directions, the changing of the focal point volume being performed by: the at least one optical element, and/or a variation of an effective numerical aperture of the optical imaging system, and/or a variation of a beam diameter along the optical path, said changing the focal point volume comprising applying a combination of relatively larger focal point volumes and relatively smaller focal point volumes to the focal points on at least one layer of the material such that each three-dimensional component is built up from solidified volume elements of different volumes.

2. The method according to claim 1, wherein the changing of the focal point volume is performed by the variation of the beam diameter along the optical path and wherein the variation of the beam diameter is performed by a variable expansion optics or an adjustable aperture.

3. The method according to claim 1, wherein the changing of the focal point volume is performed by the at least one optical element disposed in the optical path between the source of electromagnetic radiation and the optical imaging system focusing on the focal point and wherein the at least one optical element is comprised of a diffractive optical element and/or an optical lens.

4. The method according to claim 1, wherein the changing of the focal point volume is performed by the at least one optical element disposed in the optical path between the source of electromagnetic radiation and the optical imaging system focusing on the focal point and wherein the at least one optical element comprises a beam forming system comprising two cylindrical lenses held at a variable distance relative to each other.

5. The method according to claim 1, the changing of the focal point volume is performed by the variation of the beam diameter along the optical path and wherein the variation of the beam diameter is performed by at least one fast moving beam deflection system.

6. The method according to claim 1, wherein an effective numerical aperture of the optical imaging system is selected to be smaller than 0.8.

7. The method according to claim 6, wherein the effective numerical aperture of the optical imaging system is selected to be smaller than 0.2.

8. The method according to claim 1, wherein the changing of the focal point volume is performed in three spatial directions perpendicular to one another.

9. The method according to claim 1, wherein the construction platform is stepwisely lifted during the ongoing build progress.

10. The method according to claim 1, wherein the focal point is located at a distance from the tank bottom.

11. The method according to claim 1, wherein the normal distance of the focal point from the tank bottom is kept constant at the changing focal point volume.

12. The method according to claim 1, wherein, on a surface of the component to be produced, volume elements are built of solidified volume elements with smaller volumes than solidified volume elements in an interior of the component.

13. The method according to claim 1, wherein the largest focal point volume is larger than 1 $\mu m^3$.

14. A device for the lithography-based generative production of three-dimensional components, comprising:
a source of electromagnetic radiation,
a tank with a tank bottom permeable to the electromagnetic radiation at least in certain areas, into which material to be solidified can be filled, the electromagnetic radiation configured to be introduced from the source into the material from below and through the tank bottom,
a construction platform held at an adjustable level above the tank bottom,
a radiation unit actuatable for position-selective radiation from below through the tank bottom of material present between the construction platform and the tank bottom, wherein the radiation unit comprises an optical imaging system, at least one optical element, and a deflection unit;
the optical imaging system configured for successively focusing the electromagnetic radiation on focal points within the material by beam deflection; to solidify a volume element of the material respectively present at each focal point by multiphoton absorption,
the at least one optical element being disposed in an optical path between the source of electromagnetic radiation and the optical imaging system,
the deflection unit being disposed upstream of the optical imaging system and disposed downstream of the source of electromagnetic radiation, for deflecting the electromagnetic radiation and adjusting the focal points in a plane substantially parallel with the tank bottom by changing a direction of a beam of the electromagnetic radiation emanating from the deflection unit, while holding the optical imaging system stationary, and
a control unit cooperating with the radiation unit to perform the solidifying of the volume elements located in a layer on the construction platform so as to form a layer of pregiven geometry by control of the radiation unit, including being configured to: change a focal point volume on the focal points within the material to change a state of material at said focal points via changing a spatial intensity distribution of the electromagnetic radiation in one or more spatial directions, wherein the changing the focal point volume comprises applying a combination of relatively larger focal point volumes and relatively smaller focal point volumes to the focal points on at least one layer of the material such that each three-dimensional component is successively built up in a desired shape from solidified volume elements of different volumes.

15. The device according to claim 14, wherein the at least one optical element is designed to change an effective numerical aperture of the optical imaging system.

16. The device according to claim 15, wherein the at least one optical element is arranged for varying a beam diameter along the optical path.

17. The device according to claim 15, wherein the at least one optical element is comprised of a variable expansion optics or an adjustable aperture.

18. The device according to claim 15, wherein at least one optical element is comprised of a diffractive optical element and/or an optical lens.

19. The device according to claim 15, wherein the at least one optical element comprises a beam forming system including two cylindrical lenses held at a variable distance relative to each other.

20. The device according to claim 14, wherein an effective numerical aperture of the optical imaging system is selected to be smaller than 0.8.

21. The device according to claim 20, wherein the effective numerical aperture of the optical imaging system is selected to be smaller than 0.2.

22. The device according to claim 14, wherein the control unit is configured to, after the radiation steps, adapt, for the layer, the relative position of the construction platform to the tank bottom so as to successively build up the component in the desired shape.

23. The device according to claim 14, wherein the radiation unit is arranged to adjust a focal point volume larger than 1 μm$^3$.

* * * * *

UNITED STATES PATENT AND TRADEMARK OFFICE
CERTIFICATE OF CORRECTION

Page 1 of 1

PATENT NO. : 12,358,228 B2
APPLICATION NO. : 16/315333
DATED : July 15, 2025
INVENTOR(S) : Aleksandr Ovsianikov et al.

It is certified that error appears in the above-identified patent and that said Letters Patent is hereby corrected as shown below:

On the Title Page

Item (71) Applicant:
Correct "TECHNISCHE UNIVERSITÄT WIEN, Vienna (AT)" to -- TECHNISCHE UNIVERSITÄT WIEN, Wien (AT) --

Item (72) Inventors:
Correct "Aleksandr Ovsianikov, Vienna (AT)" to -- Aleksandr Ovsianikov, Wien (AT) --
Correct "Jürgen Stampfl, Vienna (AT)" to -- Jürgen Stampfl, Wien (AT) --
Correct "Peter Gruber, Vienna (AT)" to -- Peter Gruber, Wien (AT) --

Item (73) Assignee:
Correct "TECHNISCHE UNIVERSITÄT WIEN, Vienna (AT)" to -- TECHNISCHE UNIVERSITÄT WIEN, Wien (AT) --

Signed and Sealed this
Fourteenth Day of October, 2025

John A. Squires
*Director of the United States Patent and Trademark Office*